United States Patent [19]

Fujimoto et al.

[11] Patent Number: 4,962,740
[45] Date of Patent: Oct. 16, 1990

[54] FUEL CONTROLLER FOR INTERNAL COMBUSTION ENGINE

[75] Inventors: Takanori Fujimoto; Toshiro Hara, both of Himeji City, Japan

[73] Assignee: Mitsubishi Denki Kabushiki Kaisha, Tokyo, Japan

[21] Appl. No.: 399,144

[22] Filed: Aug. 28, 1989

[30] Foreign Application Priority Data

Aug. 29, 1988 [JP] Japan .................. 63-214328

[51] Int. Cl.$^5$ ..................... F02D 41/22; F02D 17/02
[52] U.S. Cl. ......................... 123/481; 123/198 DB
[58] Field of Search ........ 123/436, 479, 481, 198 DB; 364/431.05, 431.08, 431.09; 73/117.3

[56] References Cited

U.S. PATENT DOCUMENTS

| | | | |
|---|---|---|---|
| 4,366,144 | 1/1983 | Hachiga et al. | 123/479 |
| 4,499,876 | 2/1985 | Yamamoto | 123/481 X |
| 4,886,029 | 12/1989 | Lill et al. | 123/479 |
| 4,928,228 | 5/1990 | Fujimoto et al. | 123/479 X |

FOREIGN PATENT DOCUMENTS

| | | | |
|---|---|---|---|
| 0226245 | 12/1984 | Japan | 123/481 |
| 0295841 | 12/1988 | Japan | 123/481 |

Primary Examiner—Willis R. Wolfe
Attorney, Agent, or Firm—Sughrue, Mion, Zinn, Macpeak and Seas

[57] ABSTRACT

A fuel controller for an internal combustion engine senses misfiring in an engine cylinder by sensing changes in the rotational speed of the engine between prescribed crankshaft angles due to a reduction in torque when misfiring occurs. When misfiring occurs, the supply of fuel to the misfiring cylinder is cut off for a prescribed number of engine rotations and then the supply of fuel is restarted. A warning indicator is turned on as long as misfiring is detected by the misfiring sensor.

7 Claims, 6 Drawing Sheets

FUEL CONTROLLER FOR INTERNAL COMBUSTION ENGINE

BACKGROUND OF THE INVENTION

This invention relates to a fuel controller for an internal combustion engine. More particularly, it relates to a fuel controller which can stop the supply of fuel to an individual cylinder which is misfiring.

Electronic fuel injection systems are becoming increasingly common in internal combustion engines for automobiles. In these systems, an optimal air-fuel ratio is calculated on the basis of various operating parameters such as the engine speed, the air intake rate, the air intake temperature, and the engine temperature. Electromagnetically-operated fuel injectors are then controlled so as to achieve an air-fuel mixture having the optimal air-fuel ratio.

Many cars are equipped with a catalytic converter for removing harmful components from the engine exhaust gases. A typical catalytic converter is a three-way catalytic converter which simultaneously oxidizes carbon monoxide and hydrocarbons while it reduces oxides of nitrogen (NOx). An electronic fuel injection system is usually designed to maintain the air-fuel ratio near the stoichiometric ratio so that the catalytic converter can function effectively.

Occasionally, due to breakage of parts, poor electrical connections, or equipment malfunctions, combustion does not take place properly in the cylinders of an engine and so-called "misfiring" occurs. Due to misfiring, a mixture of uncombusted fuel and air flows into the catalytic converter, and a sudden chemical reaction takes place, causing an enormous increase in the temperature of the catalytic converter. Under these conditions, the catalytic converter can not function properly, and harmful exhaust gases are discharged into the atmosphere. The increase in temperature also produces degradation of the catalytic converter and shortens its life span. Furthermore, when the automobile is stationary, if dead grass or other combustible material should contact the catalytic converter when it is at an abnormally high temperature due to misfiring, there is the possibility of a fire starting.

SUMMARY OF THE INVENTION

Accordingly, it is an object of the present invention to provide a fuel controller for an internal combustion engine which can detect misfiring of a cylinder of the engine and stop the supply of fuel to the misfiring cylinder while allowing the engine to continue running on the cylinders which are functioning normally.

It is another object of the present invention to provide a fuel controller which can automatically resume the supply of fuel when misfiring is no longer taking place.

A fuel controller for an internal combustion engine in accordance with the present invention is equipped with a misfiring sensor which detects when a cylinder of the engine misfires. When the misfiring sensor detects misfiring, a fuel supply cut-off means prevents the fuel injector of the misfiring cylinder from supplying fuel for a prescribed number of crankshaft rotations. After the prescribed number of crankshaft rotations have taken place, the fuel supply of fuel to the cylinder which misfired is automatically resumed.

Any type of misfiring sensor which can detect the misfiring of an engine cylinder can be employed. In a preferred embodiment, the misfiring sensor measures the change in rotational speed of the engine between prescribed crankshaft angles. The misfiring sensor determines that misfiring is occurring when the decrease or the percent decrease in the rotational speed is more than a prescribed quantity, indicating a drop in torque due to misfiring.

Various means can be used for preventing the fuel injector of a misfiring cylinder from supplying fuel. In a preferred embodiment, the length of time for which the fuel injectors are driven is controlled by a counter. A fuel injector of a misfiring cylinder is prevented from supplying fuel by not setting any value in the counter.

A fuel controller according to the present invention may also be equipped with a warning indicator, such as a warning lamp, which warns the driver when misfiring is taking place. The warning indicator is turned on when misfiring is detected and is not turned off until misfiring is no longer detected.

DESCRIPTION OF THE PREFERRED EMBODIMENTS

Figure 1:
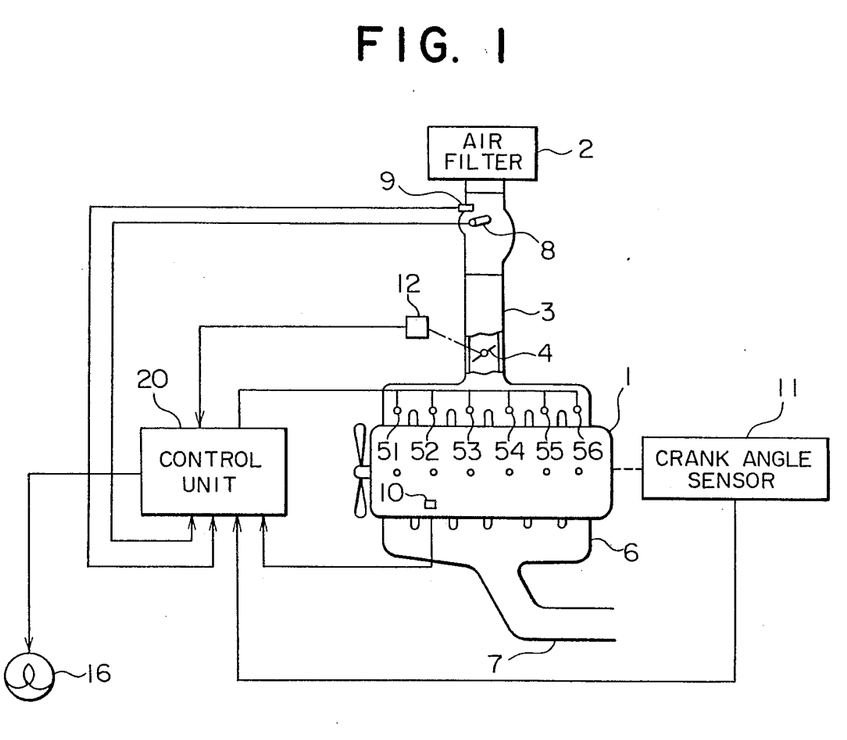
FIG. 1 is a schematic illustration of a fuel controller in accordance with the present invention as applied to a six-cylinder engine.

A preferred embodiment of a fuel controller in accordance with the present invention will now be described while referring to the accompanying drawings. FIG. 1 is a schematic illustration of a fuel controller of the present invention as applied to a four-cycle, spark-ignition automobile engine 1. The illustrated engine 1 is equipped with six cylinders, but the number of cylinders is not critical and the present invention can be applied to an engine having any number of cylinders.

As shown in FIG. 1, the engine 1 has an air intake pipe 3 which is connected to the six cylinders. An air filter 2 is mounted on the entrance of the air intake pipe 3, and a throttle valve 4 is rotatably mounted inside the air intake pipe 3. Six electromagnetically-operated fuel injectors 51 - 56 are installed on the engine 1, each of the injectors being associated with one of the six cylinders. The fuel injectors are driven by a control unit 20. Exhaust gas is discharged from the engine 1 via an exhaust manifold 6 and an exhaust pipe 7.

An air intake sensor 8 which senses the rate of air intake into the engine is mounted in the air intake pipe 3. It generates an analog voltage corresponding to the air intake rate and inputs the voltage to the control unit 20.

A thermistor-type air temperature sensor 9 which senses the temperature of the intake air is also mounted on the air intake pipe 3. It generates an analog voltage corresponding to the intake air temperature and provides the voltage to the control unit 20.

A thermistor-type water temperature sensor 10 is mounted on the engine 1. It senses the cooling water temperature and generates a corresponding analog voltage which it supplies to the control unit 20. A crank angle sensor 11 generates output pulses at prescribed crankshaft angles of the engine and supplies the pulses to the control unit 20. In a six-cylinder engine, the crank angle sensor 11 typically generates an output pulse for every 120 degrees of crankshaft rotation.

An idle switch 12 which senses when the opening of the throttle valve 4 is less than a prescribed amount is installed on the throttle valve 4. It generates an output signal which is provided to the control unit 20.

Based on the output signals from the air intake sensor 8, the air temperature sensor 9, the water temperature sensor 10, the crank angle sensor 11, and the idle switch 12, the control unit 20 calculates the appropriate amount of fuel to be supplied to the engine 1 and controls the operation of the fuel injectors 51-56 so as to supply this amount.

The control unit 20 is connected to a warning lamp 16 which is turned on by the control unit 20 when one of the cylinders of the engine 1 is misfiring.

Figure 2:
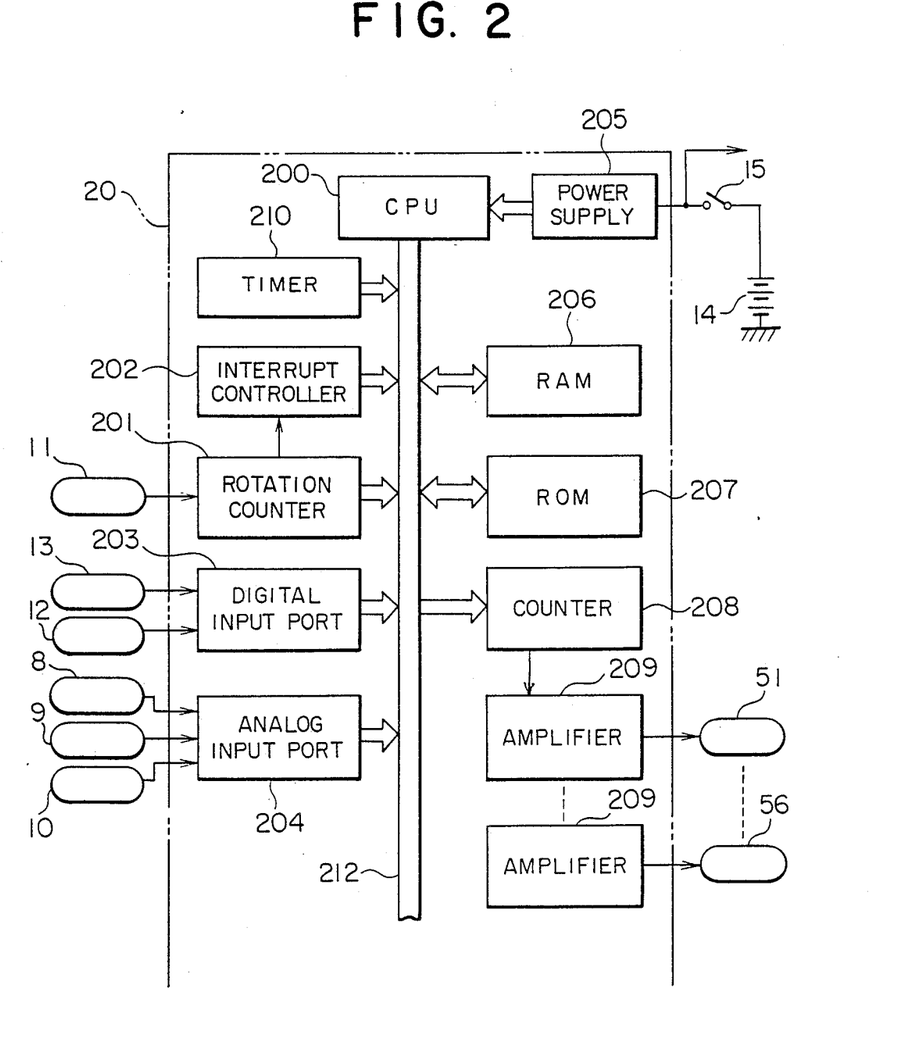
FIG. 2 is a block diagram of the control unit of FIG. 1.

FIG. 2 is a block diagram of the control unit 20 of FIG. 1. The operation of the control unit 20 is controlled by a microprocessor, which will be referred to as a CPU 200. A rotation counter 201 which is connected to the crank angle sensor 11 generates an output signal corresponding to the period between successive output pulses of the crank angle sensor 11. It also sends an interrupt signal to an interrupt controller 202 in synchrony with the engine rotations. Upon receiving the interrupt signal, the interrupt controller 202 provides an interrupt signal to the CPU 200 via a bus 212. In response to the interrupt signal, the CPU 200 executes an interrupt handling routine and calculates the amount of fuel to be supplied to the engine 1.

A digital input port 203 transmits digital inputs (such as signals from the idle switch 12 and a starter signal from a starter switch 13 which turns an unillustrated starter on and off) to the CPU 200.

An analog input port 204 includes an analog multiplexer and an A/D converter 204. The A/D converter 204 performs A/D conversion of signals from the air intake sensor 8, the air temperature sensor 9, and the cooling water temperature sensor 10 and provides the resulting digital signals to the CPU 200 in sequence.

The output signals from the rotation counter 201, the interrupt controller 202, the digital input port 203, and the analog input port 204 are transmitted to the CPU 200 via the bus 212.

A battery 14 supplies power to the CPU 200 via a key switch 15 and a power supply circuit 205.

A RAM 206 and a ROM 207 are connected to the CPU 200 by the bus 212. The RAM is used for temporary data storage, and the ROM 207 stores programs to be executed by the CPU 200 and various constants.

The duration of fuel injection by the fuel injectors 51-56 is controlled by a counter 208 in the form of a down counter equipped with a register. The counter 208 receives a signal from the CPU 200 indicating the amount of fuel to be injected and converts the signal into a pulse having a width which determines the duration of fuel injection for each fuel injector.

The output signal of the counter 208 is provided to six power amplifiers 209 which serve as drivers for the fuel injectors. Each of the amplifiers 209 is connected to a different one of the fuel injectors 51-56. All six amplifiers 209 are controlled by the same counter 208.

A timer 210 generates a signal when a prescribed length of time has elapsed and provides the signal to the CPU 200.

Figure 3:
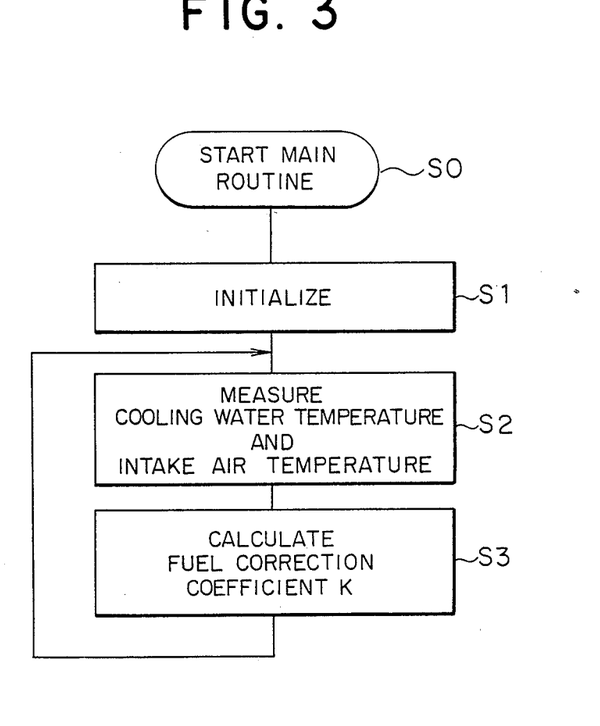
FIG. 3 is a flow chart of the main routine executed by the CPU of FIG. 2.

FIG. 3 is a flow chart of the main routine executed by the CPU 200. The operation of the control unit 20 of FIG. 2 will now be described based on this flow chart.

If the key switch 15 and the starter switch 13 are turned on to start the engine 1, in Step S0, the CPU 200 begins processing. In Step S1, initialization takes places. In Step S2, digital values corresponding to the cooling water temperature and the intake air temperature are read into the CPU 200 from the analog input port 204. In Step S3, a fuel injection correction coefficient K is calculated based on the measured temperatures and the result is stored in the RAM 206. At the completion of Step S3, the routine returns to Step S2. The CPU 200 normally repeats Steps S2 and S3 in accordance with a control program.

Figure 4:
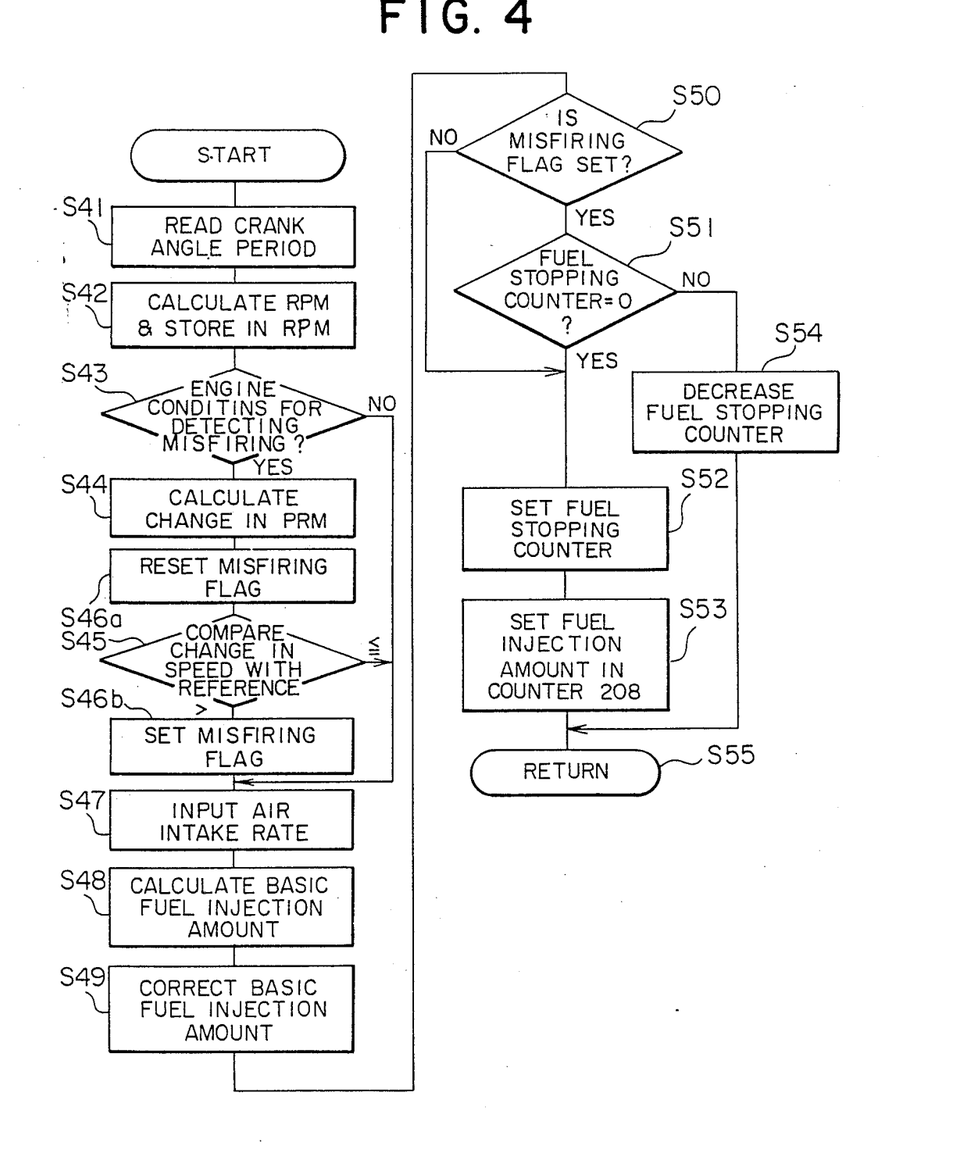
FIG. 4 is a flow chart of an interrupt handling routine executed by the CPU of FIG. 2.

When an interrupt signal is input from the interrupt controller 202, the CPU 200 immediately interrupts its processing, even if it is in the middle of the main routine, and transfers to an interrupt handling routine, a flow chart of which is illustrated in FIG. 4.

First, in Step S41, a signal which indicates the period between successive output pulses of the crank angle sensor 11 is input from the rotation counter 201, and in Step S42 the CPU 200 calculates the engine rotational speed using the formula Rotational Speed = X / Period between Pulses wherein X is a constant. The calculated rotational speed is then stored in the RAM 206.

In Step S43, it is determined whether or not misfiring detection should be performed. Generally, in this embodiment, misfiring detection is performed only when the engine is running at a steady state, or when it is idling. A steady state can be detected by a device which senses sudden acceleration or deceleration based on changes in the air intake rate. It can be determined whether the engine is idling based on the output signal from the idle switch 12, an output signal from an unillustrated speedometer, or the output signal from an unillustrated neutral switch. Devices for detecting a steady state or engine idling are well known to those skilled in the art and a detailed explanation of their structure and operation will be omitted.

If it is determined in Step S4 that the engine conditions are suitable for detecting misfiring, then the routine proceeds to Step S44, and if it is determined that misfiring detection should not be performed, then the routine proceeds to Step S47.

In Step S44, the change between the previous rotational speed (which was stored in the RAM 206 in Step S42 the previous time that the interrupt routine was executed) and the present rotational speed (which was just stored in the RAM 206) is calculated.

In Step S46a, a misfiring flag for the cylinder which is now in its power stroke is reset, and in Step S45, the change in rotational speed is compared with a reference value.

If the absolute value of the change in rotational speed is greater than the reference value and the rotational speed has decreased, then it is determined that misfiring has occurred, and in Step S46b, the misfiring flag corresponding to the cylinder which is now in its power stroke is set.

On the other hand, if the absolute value of the change in rotational speed is less than or equal to the reference value, or if the absolute value of the change in rotational speed is larger than the reference value but the engine speed has increased, then it is determined that the cylinder is not misfiring, and the routine proceeds to Step S47.

Figure 5:
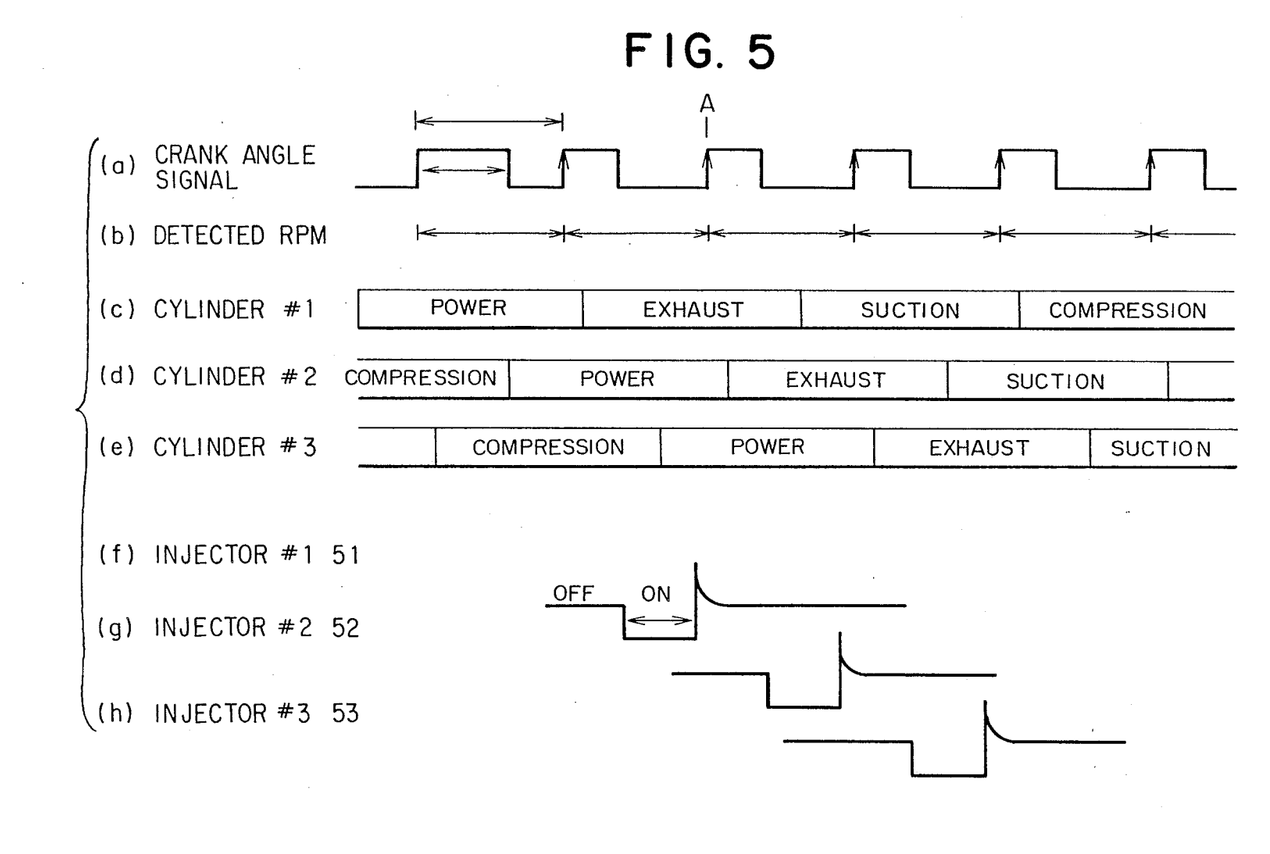
FIG. 5 is a timing diagram showing the output of the crank angle sensor and the operation of the fuel injectors as a function of time.

The misfiring detection which is performed in Steps S44–S46b will be explained in greater detail while referring to FIG. 5 which is a timing diagram. In FIG. 5, (a) shows the output signal of the crank angle sensor 11. (b) shows the periods of time for which the rotational speed is measured. (c)–(e) illustrate the state in each of the first three cylinders. (f)–(h) show the drive pulses for the fuel injectors 51–53 for the first three cylinders. The interrupt handling routine is executed upon each rising edge of the output of the crank angle sensor 11. The arrow at A indicates the time of an interrupt request to the CPU 200 from the interrupt controller 202.

At time A, the present rotational speed (during the power stroke of cylinder #2) is compared with the previous rotational speed (during the power stroke of cylinder #1). If misfiring takes place during the power stroke of cylinder #2, the torque which is output by the engine will suddenly fall, so the present rotational speed will be much less than the previous rotational speed. The change in rotational speed will therefore exceed the reference value, and the CPU 200 will determine that cylinder #2 is misfiring. The crank angle sensor 11, the rotation counter 201, and the CPU 200 thus constitute means for sensing a misfiring cylinder of the engine.

In this embodiment, the crank angle sensor 11 is constructed so that the output pulse which is generated when cylinder #1 is in its power stroke has a high level which is longer than for the other cylinders. Therefore, by using the pulse for cylinder #1 as a reference, it is possible to differentiate each of the cylinders, and it can be determined which cylinder is misfiring. In Step S46b, a misfiring flag for the cylinder which is misfiring is set and stored in the RAM 206.

As shown in lines (f)–(h) of FIG. 5, each fuel injector is driven during the exhaust stroke of the corresponding cylinder. Each fuel injector supplies fuel to a cylinder for the period of time marked ON in the figure.

Returning now to the flow chart of FIG. 4, in Step S47, a signal indicating the air intake rate is input from the analog input port 204 In Step S48, the basic fuel injection amount is calculated based on the engine rotational speed and the air intake rate. In Step S49, the fuel injection correction coefficient K, which was calculated in the main routine, is read from the RAM 206 and the basic fuel injection amount is corrected using this coefficient to obtain the actual fuel injection amount. In Step S50, it is checked whether the misfiring flag is set for the cylinder into which injection is to take place. If the misfiring flag is not set, then the routine proceeds to Step S52. If the misfiring flag is set, then in Step S51, the value of the counter called the fuel injector stopping counter is checked. If this counter value is not equal to zero, then in Step S54, the value of the stopping counter is decreased by a prescribed amount such as 1, and in Step S55, the main routine is returned to. On the other hand, if the value of the stopping counter is equal to zero, then in Step S52, the stopping counter is set equal to a prescribed initial value. The initial value indicates the number of crank angle signals for which a fuel injector will remain off if misfiring is detected. In Step S53, the actual fuel injection amount is set in counter 208, and the fuel injector of the cylinder which is now in its exhaust stroke is driven for a length of time corresponding to the fuel injection amount. In Step S55, the main routine is returned to.

Misfiring is sometimes a transient phenomenon. For example, it may be due to a momentary change in the rotational speed of an engine. After a cylinder misfires, if the cause of the misfiring disappears, the cylinder may return on its own to a normal state. However, a misfiring sensor can not detect the cause of misfiring, only the result, such as a drop in rotational speed, and if the supply of fuel to a cylinder is cut off, it is impossible to determine whether the drop in rotational speed which is sensed by the misfiring sensor is due to misfiring or to the cut-off of the fuel supply.

Accordingly, in the present invention, after the supply of fuel to a misfiring cylinder has been cut off for a prescribed number of crankshaft rotations, in Step S53 of FIG. 4, the supply of fuel to the cylinder is restarted. If the cause of misfiring has disappeared, then the cylinder will start to fire again. If the misfiring of the cylinder again occurs, the supply of fuel to the misfiring cylinder will once again be cut off by the CPU 200 for a prescribed number of crankshaft rotations.

Figure 6:
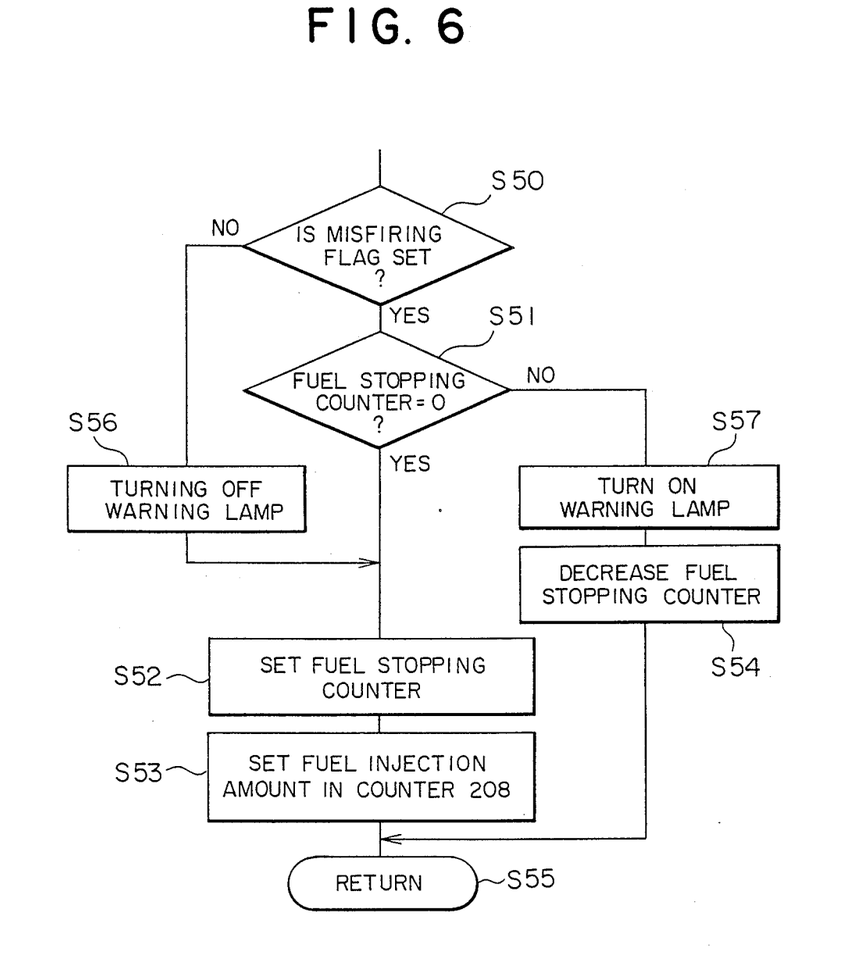
FIG. 6 is a flow chart of a portion of an another interrupt handling routine which can be executed by the CPU of FIG. 2.

When misfiring is detected, the CPU 200 turns on the warning lamp 16 indicate to the driver of the vehicle that misfiring is taking place. The warning light 16 should remain on until it is determined that misfiring is no longer taking place. FIG. 6 illustrates how the interrupt handling routine of FIG. 4 can be adapted to control the warning lamp 16 by the addition of two additional steps S56 and S57 to the routine of FIG. 4. In Step S51, if it is determined that the stopping counter is not equal to zero, then in Step S57, the warning lamp 16 is turned on and Step S54 is proceeded to. If in Step S50 it is determined that the misfiring flag for the present cylinder is not set, then in Step S56, the warning lamp 16 is turned off. Thus, as soon as misfiring is detected in a cylinder, the warning lamp 16 is turned on, and it is not turned off until the cylinder is no longer misfiring.

In accordance with the present invention, as soon as it is determined that a cylinder has misfired, the fuel injector for that cylinder is switched off, while fuel continues to be supplied to other cylinders. Therefore, the vehicle can continue to operate on the remaining cylinders. As no fuel is supplied to the cylinder which misfired, uncombusted fuel can not reach the catalytic converter. As a result, the catalytic converter can be prevented from overheating, so it is not degraded, harmful gases are not discharged from the catalytic converter, and there is no danger of fires being caused.

Furthermore, the fuel injector for the misfiring cylinder remains off for only a prescribed number of engine rotations, so that if the cause of the misfiring disappears, the cylinder which misfired can once again start operating.

In the above-described embodiment, misfiring is detected by calculating the change in the rotational speed and comparing it with a reference value. However, it is also possible to detect misfiring by comparing the percent change in the rotational speed ([present rotational speed - previous rotational speed]/previous rotational speed) with a prescribed value.

Furthermore, in accordance with the present invention, misfiring may be detected by methods other than by measuring the engine rotational speed. For example, a conventional misfiring sensor which monitors the pressure inside each of the cylinders of the engine may be used to detect misfiring.

What is claimed is:

1. A fuel controller for an internal combustion engine having a plurality of cylinders and a plurality of fuel injectors which individually supply fuel to the cylinders, comprising:
    misfiring sensing means for sensing a misfiring in any one of the cylinders of the engine; and
    fuel supply cut-off means for cutting off the supply of fuel to the misfiring cylinder for a prescribed number of rotations of the engine.

2. A fuel controller as claimed in claimed in claim 1, wherein said misfiring sensing means comprises:
    means for measuring the engine rotational speed during the power stroke of each cylinder; and
    means for determining when there is a change in the rotational speed between successive power strokes of greater than a prescribed quantity.

3. A fuel controller as claimed in claim 1, further comprising a warning indicator responsive to said misfiring sensing means for providing a warning as long as misfiring is detected by said misfiring sensing means.

4. A method for controlling the fuel supply to an internal combustion engine having a plurality of cylinders and a plurality of fuel injectors which supply fuel to the cylinders, comprising:
    measuring the rotational speed of the engine during each power stroke of the engine;
    detecting a misfiring cylinder of the engine by comparing the engine rotational speed for successive power strokes of the engine;
    cutting off the supply of fuel to the misfiring cylinder; and
    restarting the supply of fuel to the misfiring cylinder after a prescribed number of rotations of the engine.

5. A method as claimed in claim 4, wherein the step of detecting a misfiring cylinder comprises determining when the engine rotational speed during the power stroke of a cylinder is less than the engine rotational speed during the power stroke of the preceding cylinder by more than a prescribed quantity.

6. A method as claimed in claim 4, wherein the step of detecting a misfiring cylinder comprises determining when the rotational speed for the power stroke of a cylinder is less than the rotational speed during the power stroke of the preceding cylinder by more than a prescribed percent.

7. A method as claimed in claim 4, further comprising the step of providing a warning indication as long as misfiring is detected.

* * * * *